(12) United States Patent
Wilson

(10) Patent No.: US 6,947,526 B2
(45) Date of Patent: Sep. 20, 2005

(54) SYSTEMS AND METHODS FOR MONITORING AUDIO

(75) Inventor: Jeremiah E. Wilson, St. George, UT (US)

(73) Assignee: ContactPoint LLC, St. George, UT (US)

( * ) Notice: Subject to any disclaimer, the term of this patent is extended or adjusted under 35 U.S.C. 154(b) by 0 days.

(21) Appl. No.: 10/211,507

(22) Filed: Aug. 2, 2002

(65) Prior Publication Data

US 2004/0022370 A1 Feb. 5, 2004

(51) Int. Cl.$^7$ ............................................. H04M 1/64
(52) U.S. Cl. ........................ 379/68; 379/67.1; 379/133; 455/416
(58) Field of Search ................ 455/67.1, 67.7, 455/410, 415, 575, 1, 550.1, 422.1, 554.2, 403, 445, 458, 459, 460, 461, 9, 515, 518–521, 451.1, 550; 379/112.01, 133, 68, 67.1, 140, 119, 135, 265.02, 35, 93.06, 265, 309, 387, 267, 266.1, 34, 266, 59, 34.67, 85, 210, 112; 340/540, 541, 3.1, 539, 574

(56) References Cited

U.S. PATENT DOCUMENTS

| | | | | |
|---|---|---|---|---|
| 4,521,915 A | * | 6/1985 | Baker et al. ................. | 455/165 |
| 4,712,230 A | * | 12/1987 | Rice et al. ................... | 379/112 |
| 5,428,667 A | * | 6/1995 | Easterling et al. ............ | 379/59 |
| 5,535,256 A | * | 7/1996 | Maloney et al. .............. | 379/34 |
| 5,590,171 A | | 12/1996 | Howe et al. .................. | 379/33 |
| 5,764,728 A | | 6/1998 | Ala et al. .............. | 379/265.06 |
| 5,841,854 A | * | 11/1998 | Schumacher et al. ....... | 379/265 |
| 5,854,825 A | | 12/1998 | Mukaihara et al. ......... | 379/309 |
| 5,983,096 A | * | 11/1999 | Lietha et al. ................ | 455/416 |
| 6,047,060 A | * | 4/2000 | Fodorov et al. ............ | 379/265 |
| 6,301,246 B1 | | 10/2001 | Shaffer et al. .............. | 370/352 |
| 6,363,145 B1 | * | 3/2002 | Shaffer et al. ......... | 379/265.02 |
| 6,433,683 B1 | * | 8/2002 | Robinson .................... | 340/540 |
| 6,510,220 B1 | * | 1/2003 | Beckett, II et al. ..... | 379/265.06 |
| 2002/0095490 A1 | * | 7/2002 | Barker et al. ............... | 709/224 |

FOREIGN PATENT DOCUMENTS

GB      WO 01/15453 A1 * 3/2001 ............ H04N/7/18

\* cited by examiner

*Primary Examiner*—Edward F. Urban
*Assistant Examiner*—Charles Chow
(74) *Attorney, Agent, or Firm*—Michael F. Krieger; Kirton & McConkie

(57) ABSTRACT

Systems and methods for monitoring sound from a remote location. A monitor box is connected to an outside telephone line and to a device that provides sound to the monitoring box. In one implementation, the device is a telephone coupled to its own telephone line, and the monitor box is connected to the telephone through the use of a splitter located between the handset and base of the telephone. Thus, a supervisor or other individual may contact the monitor box from a remote location by calling into the outside telephone line connected to the monitor box and monitor a conversation that occurs on one of the telephone line corresponding to the telephone. Implementation of the present invention also embraces connecting the monitor box to other devices or systems that provide audio for selective monitoring, including a microphone, a central telephone system, a receiver, a frequency scanner, a computer device, or any other device that is capable of providing sound to the monitor box for monitoring by an individual from a remote location.

15 Claims, 6 Drawing Sheets

SYSTEMS AND METHODS FOR
MONITORING AUDIO

BACKGROUND OF THE INVENTION

1. Field of the Invention

The present invention relates to monitoring audio. In particular, the present invention relates to systems and methods for monitoring sound, including voice, music or any other audible noise, from any source and for allowing the monitoring to occur from a remote location. Implementation of the present invention embraces the use of any type of telephone, or alternatively without a telephone system.

2. Background and Related Art

Business owners and supervisors have recognized the benefit of being able to listen to conversations of their employees in work related situations to ensure that a proper image of the employer is projected to customers. This is particularly true for such businesses that commonly exchange with customers via telephone conversations. Listening to the conversations allows the supervisors to evaluate and train the employees in their customer service skills, to monitor the kinds of concerns raised by customers, and to witness the use of abusive language, thereby resulting in providing improved customer service and increased sales performance.

Traditional techniques used to monitor telephone conversations include providing a physical connection to the telephone wire that is to be monitored. For example, a permanent splice can be made on the monitored telephone wire. Alternatively, a clip may be placed at a junction box, as is typically performed by a telephone repairman. While these techniques allow for the monitoring of a telephone wire, the permanent splice limits the monitoring to only that particular telephone line and the clip requires a manual process of moving the clip from one telephone wire to another.

Another traditional technique includes having the line used for monitoring and the line that is being monitored routed through the same local switch. By way of example, a sales supervisor who has two telephone lines can monitor a sales line at his/her office through the use of a bridge between the sales line and a supervisory line. While this technique provides a mechanism for monitoring, it offers no flexibility in changing the monitoring set-up and only enables local monitoring within phone system. Accordingly, when for example a salesperson for the business works out of a sales office that is different from the office of the sales supervisor, the sales and supervisory lines may not be serviced by the same system or local switch. The sales supervisor is thus unable to monitor the outside sales line because a mechanical connection or bridge cannot be established between the sales and supervisory lines. Thus, the supervisor is restricted to monitoring only the local sales force, which is a great disadvantage in today's business world where it is typical to have a sales office in one location and a supervisory office in another location.

Another technique includes receiving a call into a particular system and then routing that call through another line. With the increase in employees working from their homes, a technique was created whereby a customer may call into a system and that system then assigns and routs the call to an agent located in his/her home. Because the call is routed through the internal system, the call may be monitored from within the system. While this technique allows for monitoring to occur, the monitoring is limited to local monitoring. Moreover, this technique of receiving and then routing calls to a remote location typically incurs large long distance costs for each call received, especially when the incoming call is made on a toll-free line and then is routed to a long-distance number.

Thus, while techniques currently exist that enable a telephone conversation to be monitored by a third party, challenges still exist, including limiting any monitoring that is performed to local systems. Accordingly, it would be an improvement in the art to augment or even replace current techniques with other techniques.

SUMMARY OF THE INVENTION

The present invention relates to monitoring audio. In particular, the present invention relates to systems and methods for monitoring sound, including voice, music or any other audible noise, from any source and for allowing the monitoring to occur from a remote location.

Implementation of the present invention takes place in association with a monitor box that is connected to an outside telephone line and to a device that provides sound to the monitoring box. In one particular implementation, a monitor box is connected to an outside telephone line and to one or more telephones, wherein each telephone has its own telephone line, and wherein the monitor box is connected to each telephone through the use of a splitter that is located between the handset and base of each telephone. Furthermore, implementation of the present invention embraces systems that include multiple lines that are connected to a monitor box, allowing one or more individuals to dial into the multiple lines in order to monitor audio. Thus, a supervisor or other individual is able to contact the monitor box from a remote location by calling into the outside telephone line connected to the monitor box and monitor a conversation that is occurring on one of the telephone lines corresponding to one of the telephones. In one implementation the supervisor is only able to hear the conversation. In another implementation the supervisor may hear and participate in the conversation. In a further implementation, the supervisor provides a code (e.g., by selecting one or more buttons on the supervisor's telephone) to the monitor box across the outside line to select a particular line for monitoring. Alternatively, the monitoring box may automatically scan each of the telephone lines until a conversation is located to enable the supervisor to monitor that conversation. Implementation of the present invention further embraces systems wherein a monitor box is connected to a company line to enable monitoring to occur. Moreover, in at least one implementation the supervisor may selectively monitor an initial number that is used, for example, by customers to contact a business, as well as any associated rollover numbers.

Implementation of the present invention also embraces connecting the monitor box to other devices or systems that provide audio to the monitor box for selective monitoring. For example, the monitor box may be connected to an outside telephone line that may be used by a supervisor or other individual to contact the monitor box from a remote location, and the monitor box may be coupled to a microphone, a central telephone system, a receiver, a frequency scanner, a computer device, or any other device that is capable of providing sound to the monitor box for monitoring by an individual from a remote location.

Implementation of the present invention also embraces, but is not limited to, the use of a computer device that is connected to the monitor box. The computer device may selectively provide audio to the monitor box for monitoring or may receive audio from the monitor box for monitoring and/or recording the audio as an audio file. Moreover, the computer device may be used to provide a selective telephone dialing for the monitoring of calls that are preserved in a file of a database folder.

While the methods and processes of the present invention have proven to be particularly useful in the area of monitoring telephonic conversations, those skilled in the art will appreciate that the methods and processes can be used in a variety of different applications and in a variety of different areas of manufacture to enable the monitoring of any sound from a remote location.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

Figure 1:
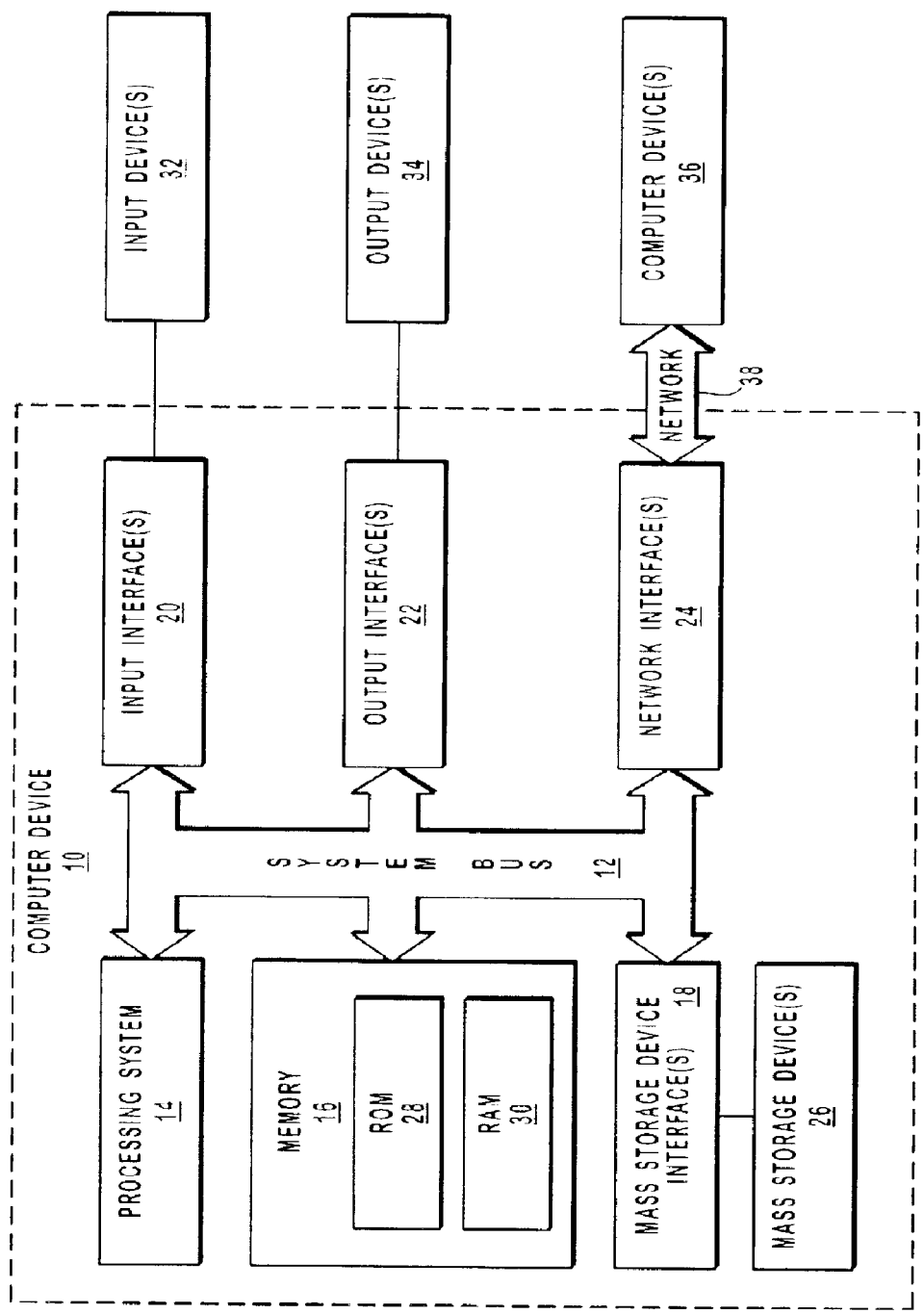
FIG. 1 illustrates a representative computer device that, while not required, may be used in association with embodiments of the present invention of the present invention.

The present invention relates to monitoring audio. In particular, the present invention relates to systems and methods for monitoring sound, including voice, music or any other audible noise, from any source and for allowing the monitoring to occur from a remote location.

Embodiments of the present invention take place in association with a monitor box that is connected to an outside telephone line and to a device that provides sound to the monitor box. In one embodiment, a monitor box is connected to an outside telephone line and to one or more telephones or CO lines from a telephone company, wherein each telephone is connected to its own telephone line, and wherein the monitor box is connected to each telephone through a splitter that is located between the handset and base of each telephone. As will be further disclosed below, a supervisor or other individual contacts the monitor box from a remote location by calling into the outside telephone line and monitors a conversation on a telephone line corresponding to one of the telephones.

In a further embodiment, the supervisor provides a code to the monitor box across the outside line to select a particular line for monitoring. In one embodiment, the code is provided by selecting one or more buttons on the supervisor's telephone to transmit one or more tones to the monitor box. Alternatively, the monitoring box automatically scans each of the telephone lines until a conversation is located to enable the supervisor to monitor the located conversation. In yet another embodiment, a monitor box is connected directly to a company line. Moreover, embodiments of the present invention embrace the ability to selectively monitor business lines, including initial lines and any rollover lines.

Embodiments of the present invention also embrace connecting the monitor box to other devices or systems that provide audio to the box for monitoring. For example, the monitor box may be connected to a microphone, a central telephone system, a receiver, a frequency scanner, a computer device, or any other device that is capable of providing sound to the monitor box for monitoring by an individual from a remote location, as will be further discussed below.

Embodiments of the present invention also embrace the use of a computer device that is connected to the monitor box to provide audio for monitoring or to receive audio from the monitor box for monitoring and/or for digitally recording the audio. Moreover, embodiments embrace the use of a computer device to provide a selective telephone dialing for the monitoring of calls that are preserved in a file of a database folder.

The following disclosure of the present invention is grouped into two subheadings, namely "Representative Computer Device" and "Using a Monitor Box to Remotely Monitor Sound." The utilization of the subheadings is for convenience of the reader only and is not to be construed as limiting in any sense.

Representative Computer Device

As provided above, some of the embodiments of the present invention embrace the use of a computer device that is connected to a monitor box to provide audio for monitoring or to receive audio from the monitor box for recording. Furthermore, embodiments of the present invention embrace the use of a computer device to provide selective telephone dialing for the monitoring of calls that are preserved in a file of a database folder. Accordingly, the following is a discussion relating to a representative computer device that may be used in association with a monitor box in a system that enables sound to be remotely monitored in accordance with the present invention.

FIG. 1 and the corresponding discussion are intended to provide a general discussion of a representative computer device that, while not required, may be used in association with embodiments of the present invention of the present invention. One skilled in the art will appreciate that the invention may be practiced in association with one or more computing devices and in a variety of system configurations, including in a networked configuration.

Embodiments of the present invention embrace one or more computer readable media, wherein each medium may be configured to include or includes thereon data or computer executable instructions for manipulating and/or preserving data, including sound data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative computer device is illustrated as computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device.

The foregoing discussion related to a representative computer device that may be used in association with the present invention. In one embodiment, a computer device is connected to an audio in adapter and/or to an audio out adapter of an audio monitor box as will be discussed below to enable an audio exchange between the computer device and the monitor box.

In another embodiment, the computer device connected to the monitor box and is used to selectively access a database that includes information relating to individuals to contact. The computer device selectively initiates a contact to one or more of the individuals and records the contacts. In a further embodiment, a voice modem port on the computer device or a telephony card is used to enable an exchange with the individuals and/or to enable a user at the computer device to monitor an exchange.

While the foregoing discussion related to a representative computer device that may be used in association with the present invention, those skilled in the art will appreciate that embodiments of the present invention exist that do not require the use of a computer device in order to monitor audio.

Using a Monitor Box to Remotely Monitor Sound

Figure 2:
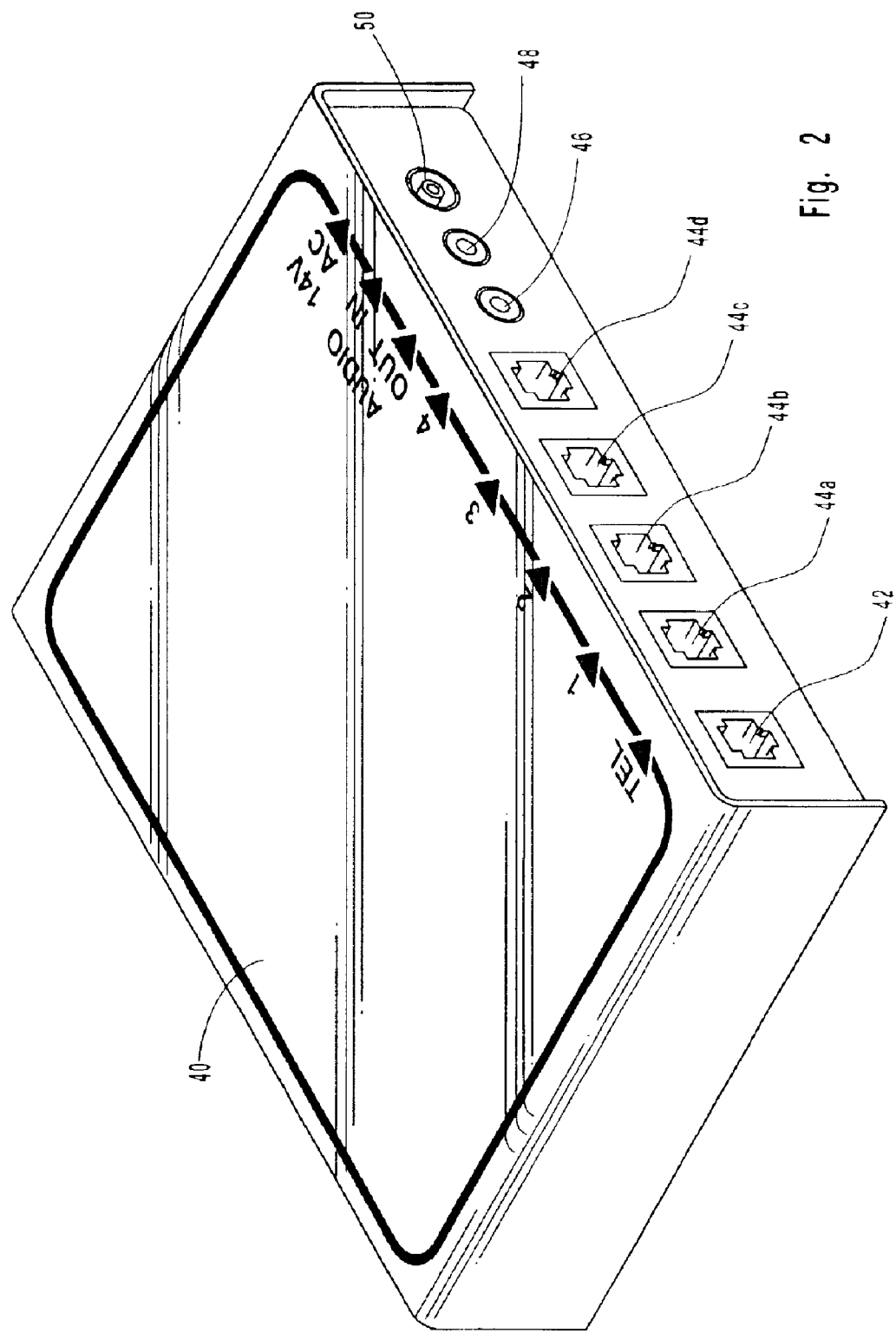
FIG. 2 illustrates a representative monitor box that may be used in association with the present invention to enable monitoring audio from a remote location.

As provided above, embodiments of the present invention take place in association with a monitor box that is connected to an outside telephone line and a device that provides sound to the monitor box. With reference to FIG. 2, a representative monitor box is illustrated as monitor box 40, which may be used in association with embodiments of the present invention to enable the monitoring of audio from a remote location.

Those skilled in the art will appreciate that embodiments of the present invention embrace a variety of different types of monitor boxes having a variety of different types of connectors or ports for connection thereto. In FIG. 2, the illustrated embodiment includes monitoring box 40, which includes ports 42–50. Port 42 is configured to receive an outside telephone line that may be used to selectively monitor sound form a remote location. In particular, port 42 is configured to receive an RJ11 connector of a telephone jack that corresponds to an outside line that made be dialed into by a third-party/supervisor. One or more ports 44 are configured to receive audio shunted from an audio source. In the illustrated embodiment, ports 44 are configured to receive an RJ22, RJ9, or any other four-pin connector that is on an end of a jack used to connect monitor box 40 to individual telephones. While FIG. 2 illustrates four ports 44, embodiments of the present invention embrace the use of more than four or less than four. Moreover, embodiments of the present invention embrace the use of other types of connectors (e.g., RCA connectors for microphones, cables coupling receivers to the monitor box, etc.) to allow for the coupling of other types of audio sources (e.g., a microphone, a transmitter, etc.) to the monitor box.

Port 46 is configured to receive an RCA jack, wherein the associated cable provides a mechanism for receiving audio from monitor box 40. Port 48 is configured to receive an RCA jack, wherein the associated cable is configured to provide a mechanism for providing audio into monitor box 40. Port 50 is configured to receive a connector that is associated with a cable that provides power to monitor box 40.

In accordance with embodiments of the present invention, a monitor box, such as box 40, receives audio sounds that have been shunted or directed thereto and allows a supervisor, third-party or other individual to monitor the audio sounds.

Figure 3:
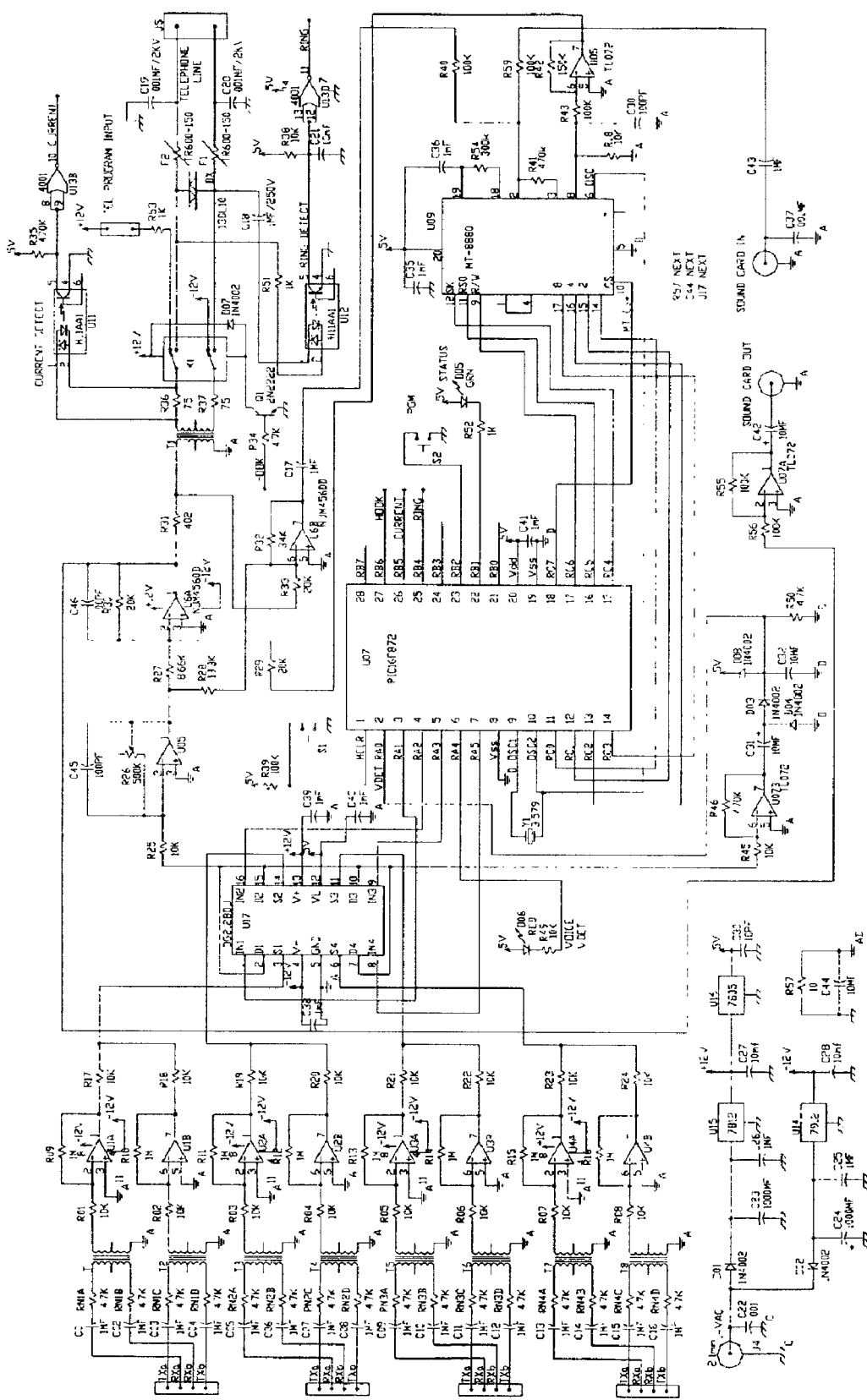
FIG. 3 provides a schematic of a representative electrical circuit corresponding the monitor box of FIG. 2.

With reference to FIG. 3, a schematic is provided of a representative electrical circuit that may be used in association with monitor box 40 of FIG. 2. The representative electrical circuit of FIG. 3 enables a supervisor or other individual to selectively contact monitor box 40 (FIG. 2) through the use of an outside telephone line in order to selectively monitor and/or participate in conversations on any of four individual telephone lines. Alternatively, the schematic enables a supervisor or individual to use a computer device through the use of ports 46 and 48 to selectively monitor and/or participate in conversations on any one of the various telephone lines.

Figure 4:
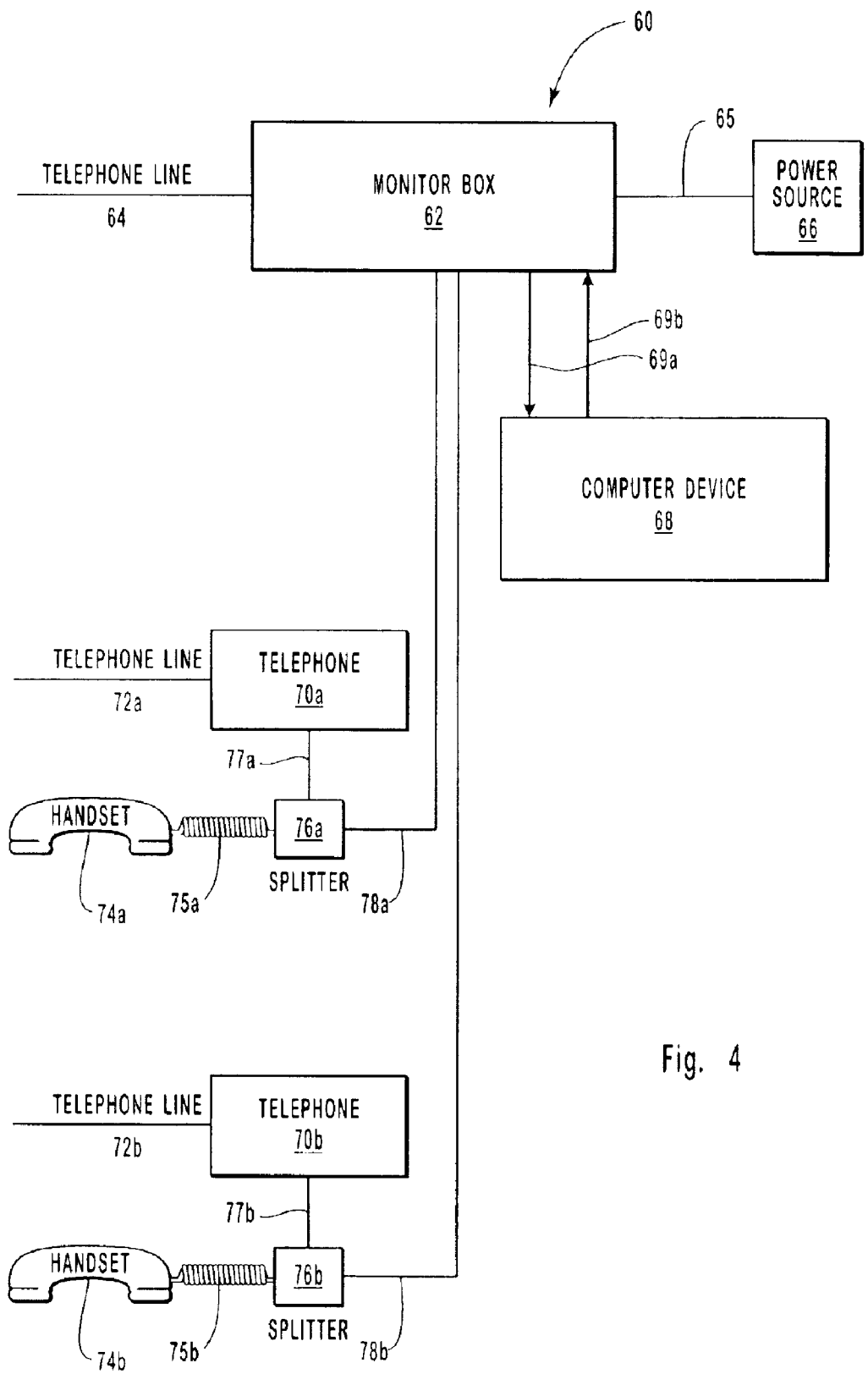
FIG. 4 illustrates a representative system that enables monitoring a telephone line from a remote location.

With reference now to FIG. 4, an illustration is provided of a representative system that enables the remote monitoring of and/or participation in a conversation on a telephone line by a third-party/supervisor. The representative system of FIG. 4 is illustrated as monitoring system 60 and includes monitor box 62, which is connected to an outside telephone line 64 to enable a supervisor or individual to selectively dial into monitor box 62 in order to monitor sound form a remote location. A power source 66 is connected to monitor box 62 through jack 65 in order to supply power to run the electrical circuit associated with monitor box 62.

In one embodiment, telephone line 64 is dedicated to enable a third-party/supervisor to remotely dial into monitor box 62. In another embodiment, line 64 is shared between use as a fax line and use to dial into monitor box 62, wherein a switch selectively actuates the use as a fax line or alternatively the use to dial into monitor box 62 in order to monitor sound shunted to monitor box 62. Moreover, embodiments of the present invention contemplate the switch being internal to monitor box 62 or alternatively being external to monitor box 62.

While not required, the embodiment of FIG. 4 includes computer device 68, which is connected to monitor box 62 through connections 69. Connection 69a provides audio from monitor box 62 to computer device 68, and connection 69b provides audio from computer device 68 to monitor box 62. Computer device 68 may be used to record conversations into digital formats and may be connected to a network to enable the recorded data to be sent electronically to another computer device.

Also connected to monitor box 62 are one or more telephones 70. In particular, an outside telephone line 72 is connected to each telephone 70 to enable a telephonic conversation at the corresponding telephone 70. Each telephone 70 also includes handset, headset or another type of receiver/transmitter to utilize the particular telephone. In FIG. 4 the receivers/transmitters are illustrated as handset 74. Splitter 76 is used in association with each telephone 70 to shunt conversations to monitor box 62. In particular, splitter 76 is coupled to the base unit of telephone 70 at connection 77, to hand set 74 at connection 75, and to monitor box 62 at connection 78.

Monitor box 62 is configured for all types of phone systems, such as digital or analog phone systems. One way in which that is accomplished is through using a handset port on a telephone, as illustrated in FIG. 4. Each splitter 76 includes two cables, wherein a first telephone cable 77 is connected to the base of telephone 70 and the second telephone cable 78 is connected to monitor box 62. Handset 74 is connected to splitter 76.

Accordingly, embodiments of the present invention embrace providing a separate line exiting a base of a telephone at the hand set connection, which shunts audio to a monitor box that is shared with a number of other telephones. This monitor box can be remotely accessed so that an individual can selectively monitor any of the conversations on the telephones connected to the box. Benefits of such a system include having a connection that occurs at the universal RJ22 junction so that the system may function on any telephone system. Another advantage is that the box can be accessed remotely from anywhere, not just within a network at a call center.

Figure 5:
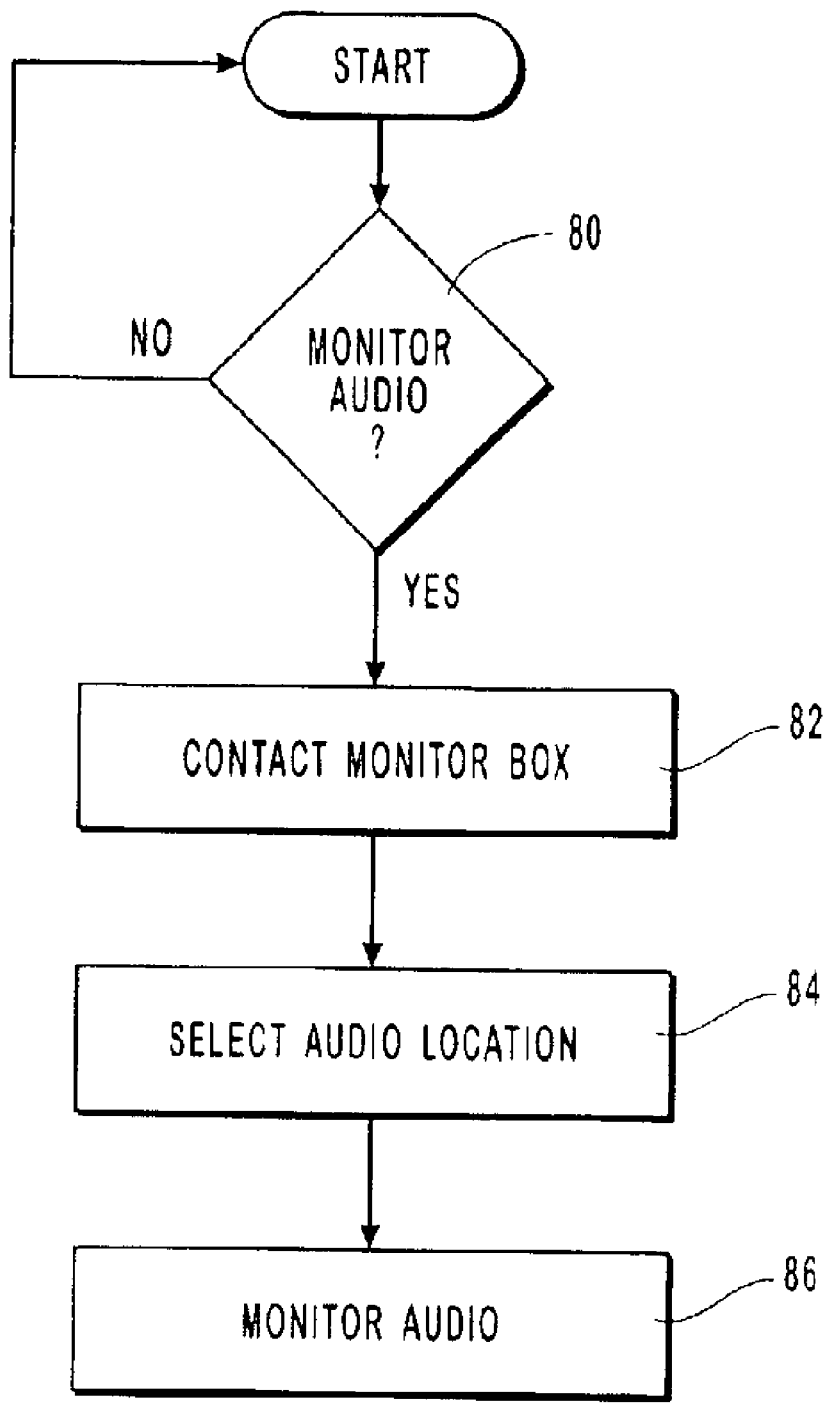
FIG. 5 is a flow chart that provides a representative method for remotely monitoring audio in accordance with the present invention.

With reference now to FIG. 5, a flow chart is illustrated that provides a representative method for remotely monitoring audio in accordance with the present invention. In FIG. 5 execution begins at decision block 80 for a determination as to whether or not to monitor audio. If it is determined at decision block 80 that audio is not to be monitored at this time, execution returns back to start. Alternatively, if it is determined at decision block 80 that audio is to be monitored, execution proceeds to step 82.

At step 82 a monitor box is contacted. In one embodiment, this is performed by remotely dialing into an outside line that is connected to the monitor box. Alternatively, the contact can be made through the use of a computer device, which may or may not be networked. For example, in one embodiment a user may access the monitor box by using a computer device that is connected to a network (e.g., the internet or another network), which is in turn connected to a computer device that is coupled to the monitor box. Execution then proceeds to step 84.

At step 84, a selection is made for the location of the audio. Examples for making a selection include providing a code to the monitor box (e.g., one or more tones across a telephone line, electronic data, etc.) that selects the location of the audio. In one embodiment, a particular tone or sequence of tones corresponds to a given audio channel carrying audio shunted to the monitor box. Thus, a user may remotely select a particular line by providing one or more tones across the outside telephone line. In another embodiment, a tone or sequence of tones initiates a scanning of all audio channels until audio, such as a conversation, is encountered for monitoring. Execution then proceeds to step 86.

At step 86, the third-party/supervisor monitors the audio that is shunted to the monitor box. The monitoring may include listening, recording and/or breaking into the audio that has been shunted to the monitor box.

Figure 6:
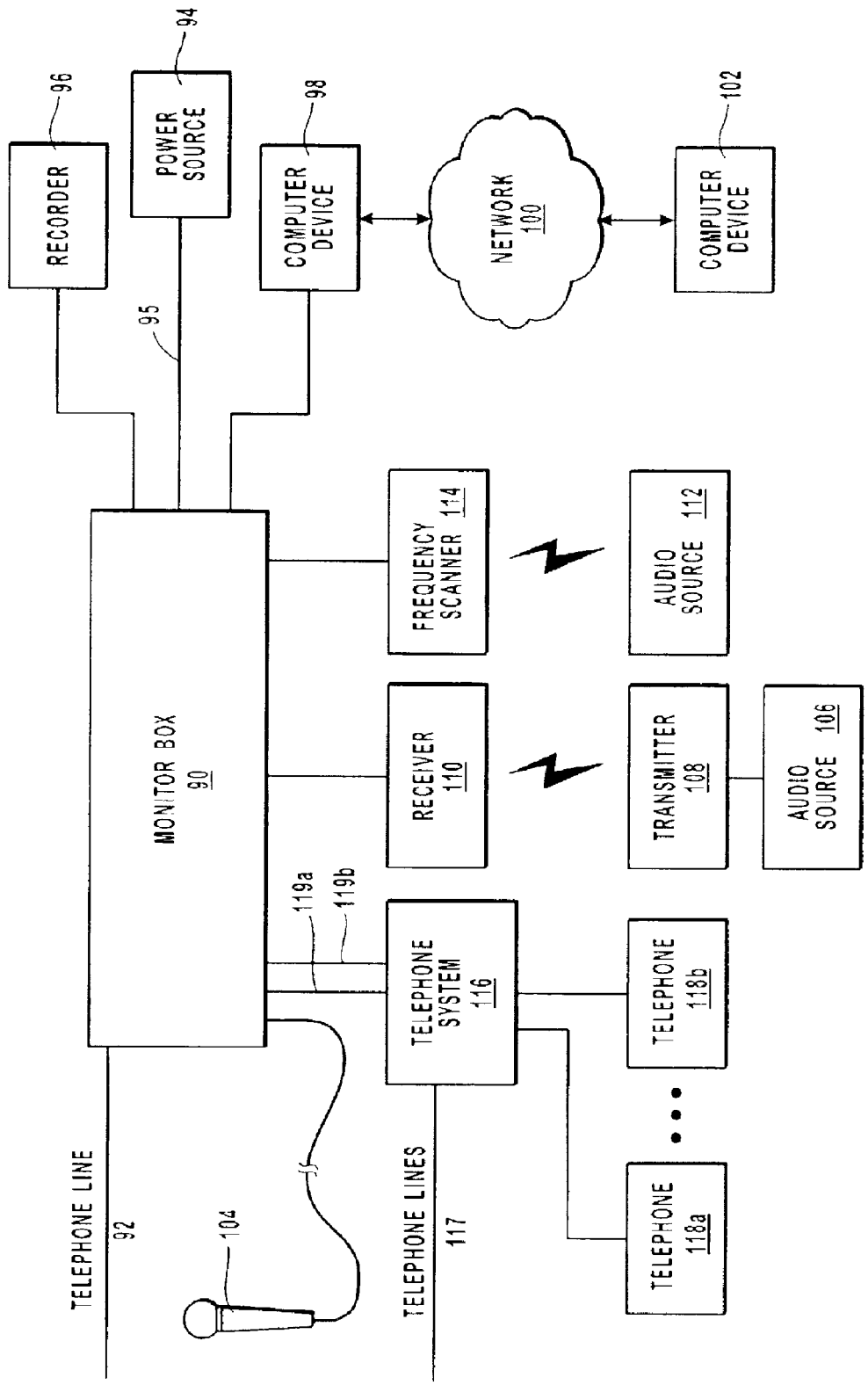
FIG. 6 illustrates other representative devices or systems that may be connected to a monitor box for the monitoring of sound in accordance with the present invention.

With reference now to FIG. 6, a representative system is illustrated that includes a variety of different types of representative devices or systems that may be connected to a monitor box for the monitoring of sound in accordance with the present invention. In FIG. 6, monitor box 90 is connected to one or more outside telephone lines 92 that can be dialed into by a third-party/supervisor. A power source 94 is also connected to monitor box 90 through a connector 95. Monitor box 90 may also be connected to a recorder 96 for selectively recording the audio that is shunted to monitor box 90. As indicated above, monitor box 90 may also be connected to a computer device 98, which may be in turn connected to a network 100 that includes one or more other computer devices 102.

Such devices or systems that may be connected to monitor box 90 to shunt sound to monitor box 90 and enable the monitoring of the sound include microphone systems, telephone systems, frequency scanners, computer devices, etc. In FIG. 6, microphone 104 is connected to monitor box 90 to allow microphone 104 to be remotely located with respect to monitor box 90 and to allow sound delivered from the microphone to the monitor box to be selectively monitored. Thus, an employee that commonly uses microphones may have his/her conversations monitored by a third-party/supervisor that dials into outside telephone line 92. While not shown, the microphone may include a splitter that allows the sound to be delivered to monitor box 90 as well as to a speaker system (not shown). Examples of such usages of a microphone system include monitoring employees that interface with public customers. For example, fast food chains typically have employees at counters or at a drive-through window. A microphone may be selectively placed on or near the employee, wherein a receiver or cable associated with the microphone is coupled to a monitor box to enable a third-party/supervisor to monitor transactions/exchanges with the public customers. Similarly, recreational parks, theme parks, movie theaters, theaters, and other businesses also typically have employees at counters, in booths or at windows. Accordingly, a microphone may be selectively placed on or near the employee, wherein a receiver or cable associated with the microphone is coupled to a monitor box to enable a third-party/supervisor to monitor transactions/exchanges with the public customers.

While FIG. 6 provides a microphone that is hard wired to monitor box 90, embodiments of the present invention also embrace the use of wireless microphone systems. For example, an audio source 106, such as a wireless microphone, may be connected to a transmitter 108 that provides a wireless audio transmission that is received by receiver 110 and delivered to monitor box 90. While in the illustrated embodiment receiver 110 is a peripheral device to monitor box 90, embodiments of the present invention also embrace the use of an integrated or internal receiver associated with monitor box 90.

Other embodiments include an audio source 112 that provides a wireless audio transmission that picked up by a frequency scanner 114, which is connected to monitor box 90. Alternatively, a telephone system 116 may be coupled to monitor box 90, wherein the telephone system is associated with one or more telephone lines 117 that are configured for use in associate with one or more telephones 118 of the telephone system 116. In particular, telephone system 116 is connected to monitor box 90 through connections 119. Accordingly, a third-party/supervisor may dial into telephone line 92 from a remote location and provide a code to monitor box 90 in order to monitor, record and/or break into a conversation that is taking place on one of the telephone lines 117, in association with a particular telephone (e.g., telephone 118*b*) of the telephone system 116.

Thus, as discussed herein, the embodiments of the present invention embrace systems and methods for monitoring sound, including voice, music or any other audible noise, from any source and for allowing the monitoring to occur from a remote location. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for remotely monitoring audio, the method comprising:

providing an audio monitoring box that is connected to (i) an outside telephone line dedicated to the audio monitoring box and (ii) a splitter, wherein the splitter is coupled to a handset and a base of a first telephone;

providing a conversation on a first telephone line between a user of the first telephone and a customer, wherein the conversation occurs independent of the audio monitoring box;

remotely dialing into the audio monitoring box through the outside telephone line;

shunting audio from the conversation on the first telephone line to the audio monitoring box to allow a supervising user who is remotely dialed into the audio monitoring box to access the audio shunted from the conversation; and using the audio monitoring box to enable the supervising user to remotely participate in the conversation, wherein the remote supervising user participation comprises at least one of:
(i) surreptitiously listening to the conversation; and
(ii) engaging in the conversation.

2. A method as recited in claim 1, wherein the outside telephone line is an analog telephone line.

3. A method as recited in claim 1, wherein the user is an employee who is employed to perform one of:
(i) obtaining orders made by customers;
(ii) providing tickets to the customers; and
(iii) receiving money from the customers.

4. A method as recited in claim 1, wherein the step for shunting audio comprises:
connecting a receiver to the audio monitoring box;
transmitting audio from the first telephone line to the receiver; and
providing the transmitted audio to the audio monitoring box.

5. A method as recited in claim 4, wherein the receiver is a frequency scanner.

6. A method as recited in claim 1, wherein the step for remotely dialing into the audio monitoring box comprises a step for providing a code to the audio monitor box to select a particular channel of audio.

7. A method as recited in claim 1, wherein the remote supervising user participation further comprises a step for recording at least a portion of the shunted audio.

8. In a system that includes an audio monitoring system that is connected to (i) an outside telephone line and to (ii) one or more splitters of a telephone system that includes one or more telephone lines connected to one or more corresponding telephones, wherein the one or more splitters are connected to the one or more telephones, a method for selectively monitoring audio of the one or more telephone lines using the audio monitoring system outside of the telephone system from any remote location in the world, the method comprising:
providing an audio monitoring system that is connected to the splitters of the telephone system and to the outside telephone line;
remotely dialing into the audio monitoring system through the outside telephone line;
providing an access code to the audio monitoring system to allow a supervising user who has remotely dialed into the audio monitoring system to access audio shunted from any of the one or more telephone lines of the telephone system; and
using the audio monitoring system to enable the supervising user to remotely participate with the audio shunted from the one or more telephone lines, wherein the remote supervising user participation comprises at least one of:
(i) surreptitiously listening to the shunted audio; and
(ii) engaging in a conversation, wherein the shunted audio includes at least a portion of the conversation.

9. A method as recited in claim 8, wherein the audio is shunted using a splitter that is coupled to the audio monitoring system, to a handset of the telephone system, and to a corresponding telephone base unit to shunt the audio to the audio monitoring system.

10. A method as recited in claim 8, wherein the remote supervising user participation further includes recording at least a portion of the shunted audio.

11. An audio monitoring system that enables a user to monitor audio from any remote location, the system comprising:
an audio monitoring box;
first telephone having a handset and a base, wherein the telephone is coupled to a first telephone line to enable a first user to participate in a conversation on the telephone line;
a splitter coupled to the first telephone handset, the first telephone base, and the audio monitoring box;
audio shunted from the first telephone through the splitter to the audio monitoring box, wherein the shunted audio includes a conversation between the first user and a first customer, and wherein the conversation occurs on the first telephone line, independent of the audio monitoring box; and
an outside telephone line coupled to the audio monitoring box, wherein the outside telephone line is dedicated to the audio monitoring box to enable a supervising user to dial into the outside telephone line from any telephone in the world and connect to the audio monitoring box to allow the supervising user to access the audio shunted from the first telephone, wherein the audio monitoring box is configured to enable the supervising user to remotely participate with the conversation on the first telephone line, and wherein the supervising user participation comprises at least one of:
(i) surreptitiously listening to the conversation; and
(ii) engaging in the conversation.

12. A system as recited in claim 11, wherein the outside telephone line is an analog telephone line.

13. A system as recited in claim 11, wherein the first telephone is part of a telephone system that includes a plurality of telephones and a corresponding plurality of telephone lines.

14. A system as recited in claim 13, wherein the audio monitoring box provides the remote supervising user with remote access to a conversation on any one of the remote telephone lines.

15. A system as recited in claim 13, wherein the remote access to a conversation on any one of the remote telephone lines is obtained by the remote supervising user providing a code to the audio monitoring box over the outside telephone line.

* * * * *